United States Patent
Zhao et al.

(10) Patent No.: US 10,422,477 B2
(45) Date of Patent: Sep. 24, 2019

(54) COMPOSITE VESSEL ASSEMBLY AND METHOD OF MANUFACTURE

(71) Applicant: UNITED TECHNOLOGIES CORPORATION, Farmington, CT (US)

(72) Inventors: Wenping Zhao, Glastonbury, CT (US); Andrzej Ernest Kuczek, Bristol, CT (US); Ellen Y. Sun, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 24 days.

(21) Appl. No.: 15/481,597

(22) Filed: Apr. 7, 2017

(65) Prior Publication Data

US 2018/0292049 A1  Oct. 11, 2018

(51) Int. Cl.
*F17C 1/16* (2006.01)
*F17C 1/04* (2006.01)
(Continued)

(52) U.S. Cl.
CPC .............. *F17C 1/16* (2013.01); *B29C 70/345* (2013.01); *F17C 1/00* (2013.01); *F17C 1/04* (2013.01); *F17C 1/06* (2013.01); *F17C 13/00* (2013.01); *B29K 2105/0872* (2013.01); *B29L 2031/7126* (2013.01); *F17C 2201/0109* (2013.01); *F17C 2201/0166* (2013.01); *F17C 2201/0171* (2013.01); *F17C 2201/054* (2013.01); *F17C 2201/056* (2013.01); *F17C 2203/0604* (2013.01); *F17C 2203/066* (2013.01); *F17C 2203/0619* (2013.01); *F17C 2203/0621* (2013.01); *F17C 2203/0624* (2013.01); *F17C 2203/0636* (2013.01);
(Continued)

(58) Field of Classification Search
CPC ...... F17C 1/16; F17C 1/04; F17C 2203/0636; F17C 2209/2118; F17C 2203/0604; F17C 2201/0109; F17C 2260/01; F17C 2209/2127; F17C 2203/066; B29C 70/345; B29K 2105/0872; B29L 2031/7126
USPC ............................ 220/582–592, 23.83–23.89
See application file for complete search history.

(56) References Cited

U.S. PATENT DOCUMENTS

| RE22,251 | E | * | 1/1943 | Stresau | .................. B21D 51/24 |
| | | | | | 220/587 |
| 2,365,697 | A | * | 12/1944 | Grubb | ...................... F17C 1/06 |
| | | | | | 220/586 |

(Continued)

FOREIGN PATENT DOCUMENTS

| EP | 1900994 A1 | 3/2008 |
| WO | 2016057024 A1 | 4/2016 |
| WO | 2016067207 A1 | 5/2016 |

OTHER PUBLICATIONS

Extended European Search Report from the European Patent Office for European Application No. 181552241; Date of completion: Feb. 26, 2018; dated Mar. 8, 2018; 8 Pages.

*Primary Examiner* — Kareen K Thomas
(74) *Attorney, Agent, or Firm* — Cantor Colburn LLP

(57) ABSTRACT

A composite vessel assembly includes a circumferentially continuous wall and an end cap. The wall includes a plurality of layers, and the end cap includes a plurality of steps. Each step of the plurality of steps is engaged to a respective layer of the plurality of layers.

2 Claims, 9 Drawing Sheets

(51) Int. Cl.
*B29C 70/34* (2006.01)
*F17C 1/00* (2006.01)
*F17C 1/06* (2006.01)
*F17C 13/00* (2006.01)
*B29L 31/00* (2006.01)
*B29K 105/08* (2006.01)

(52) U.S. Cl.
CPC ............. *F17C 2203/0663* (2013.01); *F17C 2203/0673* (2013.01); *F17C 2209/2118* (2013.01); *F17C 2209/2127* (2013.01); *F17C 2209/2154* (2013.01); *F17C 2209/225* (2013.01); *F17C 2209/232* (2013.01); *F17C 2209/234* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/033* (2013.01); *F17C 2223/035* (2013.01); *F17C 2223/036* (2013.01); *F17C 2260/01* (2013.01); *F17C 2260/011* (2013.01); *F17C 2260/018* (2013.01); *Y02E 60/321* (2013.01)

(56) References Cited

U.S. PATENT DOCUMENTS

| | | | | |
|---|---|---|---|---|
| 3,231,338 | A | * | 1/1966 | Andrus ............. B01J 3/048 196/133 |
| 3,774,296 | A | * | 11/1973 | Clay ............. B21C 37/154 228/184 |
| 4,244,482 | A | * | 1/1981 | Baumgart ............. F16J 12/00 138/142 |
| 4,296,869 | A | * | 10/1981 | Jawad ............. B65D 88/04 220/586 |
| 9,074,685 | B2 | | 7/2015 | Strack et al. |
| 9,169,351 | B2 | * | 10/2015 | Tadepalli ............. C08G 69/08 |

* cited by examiner

COMPOSITE VESSEL ASSEMBLY AND METHOD OF MANUFACTURE

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

BACKGROUND

The present disclosure relates to a vessel assembly and more particularly to a mold-less curing method of manufacturing the vessel assembly.

Pressure vessels may serve as storage media (e.g., gas) for a wide variety of consumer, commercial, and industrial processes. In order to store sufficient mass of gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessel and the complicated shapes may lead to manufacturing challenges. In addition, manufacturing needs to consistently provide reliable, high-volume, lightweight and low-cost constructions with high strength mechanical properties.

SUMMARY

A composite vessel assembly according to one, non-limiting, embodiment of the present disclosure includes a circumferentially continuous first wall including a plurality of layers; and a first end cap including a plurality of steps, wherein each step of the plurality of steps is engaged to a respective layer of the plurality of layers.

Additionally to the foregoing embodiment, the composite vessel assembly includes a liner defining a chamber, wherein the wall extends about the liner.

In the alternative or additionally thereto, in the foregoing embodiment, the first end cap covers an end portion of the liner.

In the alternative or additionally thereto, in the foregoing embodiment, the first end cap is pre-molded.

In the alternative or additionally thereto, in the foregoing embodiment, the first end cap is made of a bulk molding compound (BMC) and the first wall is made of a sheet molding compound (SMC).

In the alternative or additionally thereto, in the foregoing embodiment, the composite vessel assembly includes a second end cap disposed opposite the first end cap, the second end cap including a plurality of steps, wherein each step of the plurality of steps is engaged to a respective layer of the plurality of layers.

In the alternative or additionally thereto, in the foregoing embodiment, the first wall extends about a centerline and each layer of the plurality of layers includes a circumferentially continuous end portion that is axially staggered from one-another.

In the alternative or additionally thereto, in the foregoing embodiment, the composite vessel assembly includes a plurality of axially staggered seams, wherein each seam of the plurality of axially staggered seams includes the end portion of the respective layer of the plurality of layers and the associated step of the plurality of steps, and wherein the seam laterally spans axially.

In the alternative or additionally thereto, in the foregoing embodiment, the composite vessel assembly includes a plurality of inner walls extending circumferentially about respective centerlines aligned side-by-side, wherein the first wall is one of the plurality of inner walls; and a plurality of inner end caps each associated with a respective one of the plurality of inner walls, wherein the first end cap is one of the plurality of inner end caps.

In the alternative or additionally thereto, in the foregoing embodiment, the composite vessel assembly includes an outer wall extending about the plurality of inner walls, the outer wall including a plurality of layers; and an outer end cap disposed over the plurality of inner end caps, wherein the outer end cap includes a plurality of steps and each one of the plurality of layers of the outer wall is engaged to a respective step of the plurality of steps.

In the alternative or additionally thereto, in the foregoing embodiment, the composite vessel assembly includes at least one junction band disposed between the adjacent inner walls and the outer wall.

In the alternative or additionally thereto, in the foregoing embodiment, the at least one junction band is pre-molded.

A method of manufacturing a composite vessel assembly according to another, non-limiting, embodiment includes pre-molding a first end cap having first and second steps; placing the first end cap over an end portion of a first liner; covering a mid-portion of the first liner and the first step with a first layer of a first wall; and covering the first layer and the second step with a second layer of the first wall.

Additionally to the foregoing embodiment, the end cap is made of a bulk molding compound (BMC) and the wall is made of a sheet molding compound (SMC).

In the alternative or additionally thereto, in the foregoing embodiment, the end cap is partially cured when the first and second steps are covered with the first and second layers.

In the alternative or additionally thereto, in the foregoing embodiment, the method includes pre-molding a second end cap having first and second steps; placing the second end cap over an end portion of a second liner; covering a mid-portion of the second liner and the first step of the second end cap with a first layer of a second wall; and covering the first layer of the second wall and the second step of the second end cap with a second layer of the second wall.

In the alternative or additionally thereto, in the foregoing embodiment, the method includes covering the first and second walls with an outer wall.

In the alternative or additionally thereto, in the foregoing embodiment, the method includes placing a pre-molded junction band between the first and second walls before covering the first and second walls with the outer wall.

In the alternative or additionally thereto, in the foregoing embodiment, the method includes placing the vessel assembly in a mold assembly for composite consolidation.

In the alternative or additionally thereto, in the foregoing embodiment, the method includes placing the vessel assembly in a mold assembly for composite curing.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The detailed description explains embodiments of the invention, together with advantages and features, by way of example with reference to the drawings.

DETAILED DESCRIPTION OF THE INVENTION

Figure 1:
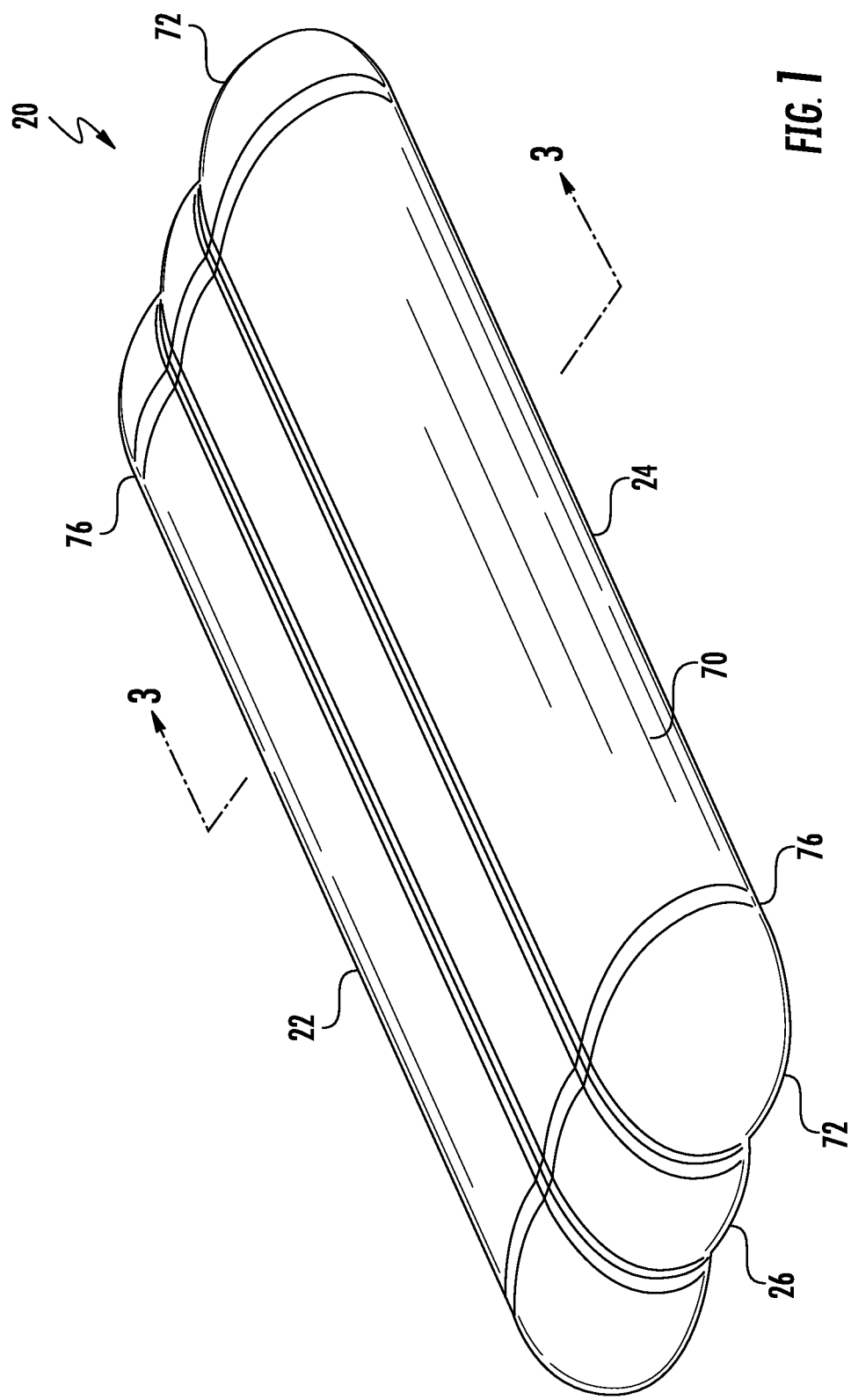
FIG. 1 is a perspective view of a vessel assembly configured to store a pressurized fluid according to an exemplary embodiment of the invention.

Referring now to FIG. 1, an example of a vessel or tank assembly 20 (also referred to as composite vessel assembly 20) may be configured to store a high pressure fluid as illustrated. Exemplary fluids that may be stored within the pressure vessel assembly 20 include, but are not limited to, compressed natural gas (CNG), hydrogen, propane, methane, air, and hydraulic fluid, for example. The vessel assembly 20 may generally include two flanking vessels 22, 24 and at least one interior vessel 26 (i.e., three vessels illustrated) joined to and disposed between the flanking vessels 22, 24. Each vessel 22, 24, 26 may generally be elongated with the overall configuration of the vessel assembly 20 generally being a rectangular shape, but as will be appreciated from the description, herein, other shapes are contemplated. It is further contemplated and understood that some applications of the present disclosure may include vessel assemblies 20 that are not under significant pressure, and that may not include any interior vessel and/or liner.

Figure 2:
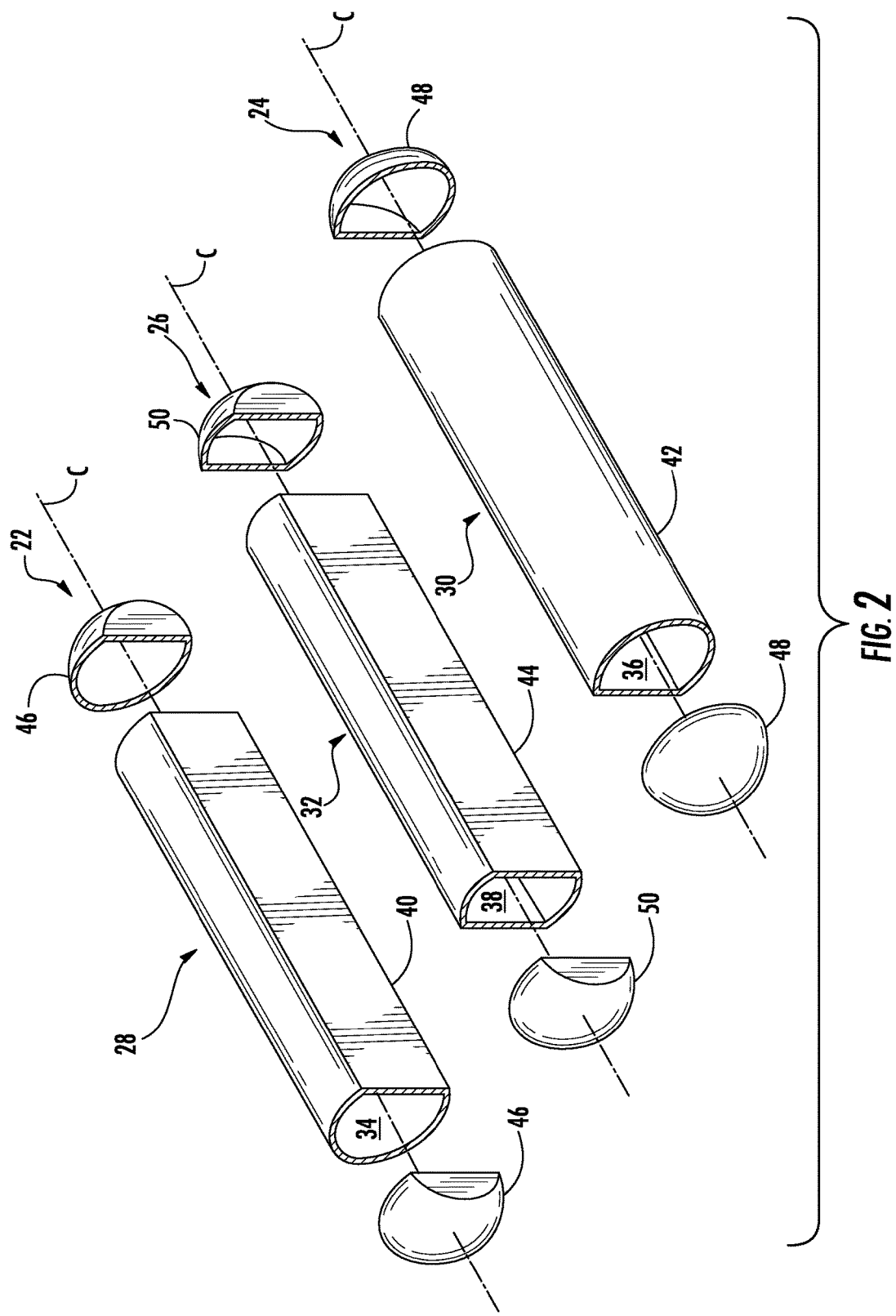
FIG. 2 is an exploded perspective view of a plurality of liners of the vessel assembly.

Referring to FIG. 2, each vessel 22, 24, 26 may include respective liners 28, 30, 32 that each define the boundaries of respective chambers 34, 36, 38 for fluid storage. Each liner 28, 30, 32 may generally extend along respective centerlines C that may be substantially parallel to one-another. Each liner 28, 30, 32 may include mid-portions 40, 42, 44 (i.e., lobes) that may extend circumferentially, and continuously, about the respective centerline C. Each mid-portion 40, 42, 44 may be open at opposite axial ends. The open ends of mid portion 40 may be closed-off by a pair of end portions 46 of the liner 28. The open ends of mid portion 42 may be closed-off by a pair of end portions 48 of the liner 30, and the open ends of mid-portion 44 may be closed-off by a pair of end portions 50 of the liner 32. In one embodiment, the end portions 46, 48, 50 (i.e., end caps) may be substantially hemispherical in shape. It is further contemplated and understood that the liners 28, 30, 32 may take the form of any shape that defines the boundaries of an internal chamber capable of storing a fluid. Although not shown, the chambers 34, 36, 38 may be in fluid communication with adjacent chamber(s).

The liners 28, 30, 32 may be a contoured bladder having a minimal wall thickness. The liners 28, 30, 32 may be made of any material and wall thickness capable of preventing or minimizing stored gas or fluid permeation through the wall, minimizing weight, reducing costs, and meeting other parameters necessary for a particular application. Examples of liner material may include a metallic foil-like composition, plastic (e.g., thermoplastic, thermoset, and other polymer materials), elastomeric material, and other resilient liner materials. The liners 28, 30, 32 may be manufactured by any variety of techniques including blow molded plastic, injection molded plastic, and others. It is further contemplated and understood that the liners 28, 30, 32 may have the necessary structural integrity to maintain a pre-formed shape either standing on their own, or, during a manufacturing process that adds or envelopes the liners with an additional layer that may be a composite material for structural strength.

Figure 3:
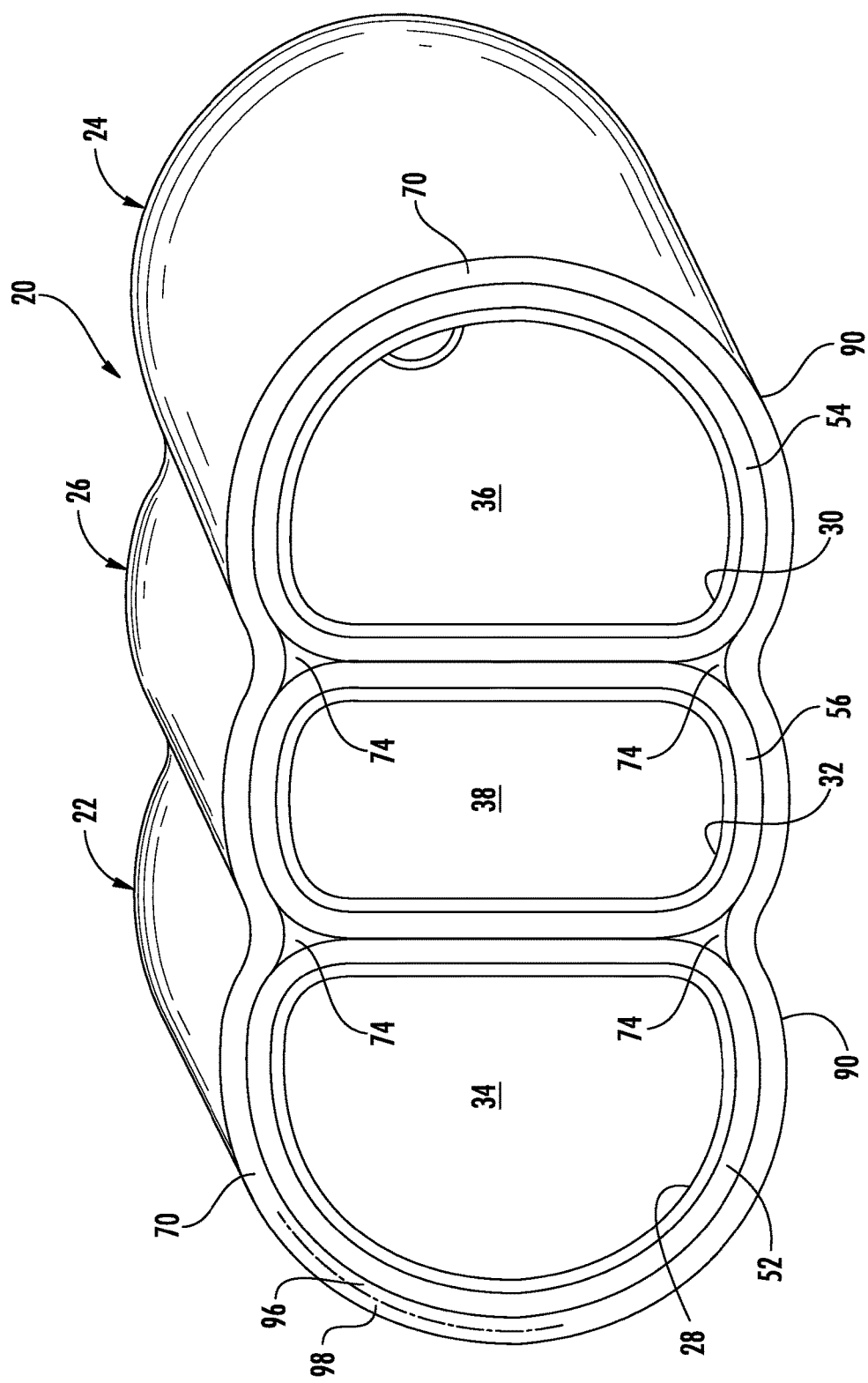
FIG. 3 is a cross section of the vessel assembly viewing in the direction of arrows 3-3 in FIG. 1.
Figure 4:
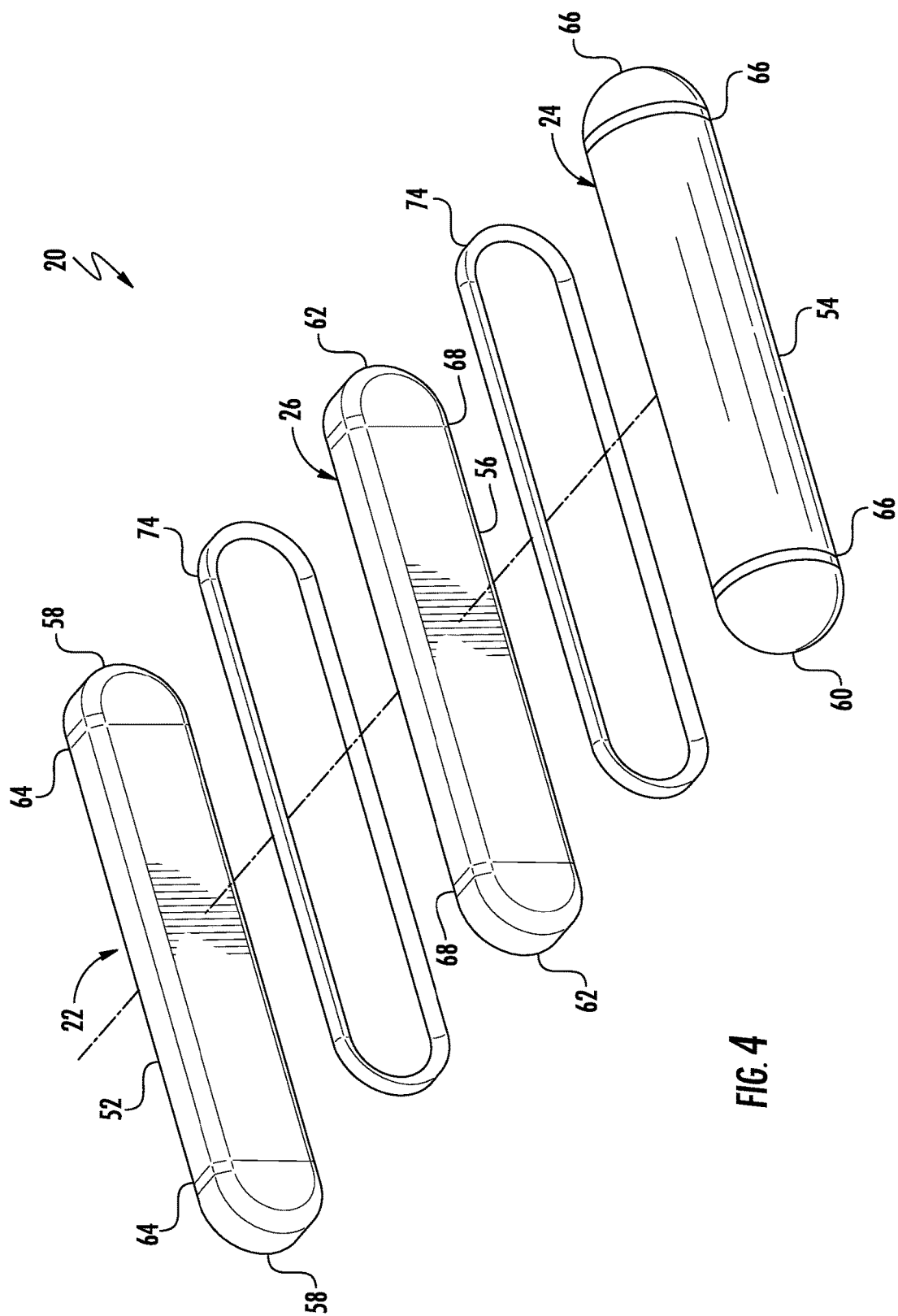
FIG. 4 is an exploded perspective view of the vessel assembly with an outer wall and outer end caps removed to show internal detail.

Referring to FIGS. 3 and 4, the vessels 22, 24, 26 may include respective inner walls 52, 54, 56, and respective pairs of inner end caps 58, 60, 62. Each inner wall 52, 54, 56 may substantially cover, and may circumferentially extend continuously about, the respective mid portions 40, 42, 44 of the respective liners 28, 30, 32. The pairs of end caps 58, 60, 62 may substantially cover the respective end portions 46, 48, 50 of the respective liners 28, 30, 32. The inner walls 52, 54, 56 may extend axially between, and are engaged to, the respective pairs of inner end caps 58, 60, 62 forming respective multi-stepped, inner, seams 64, 66, 68.

Figure 5:
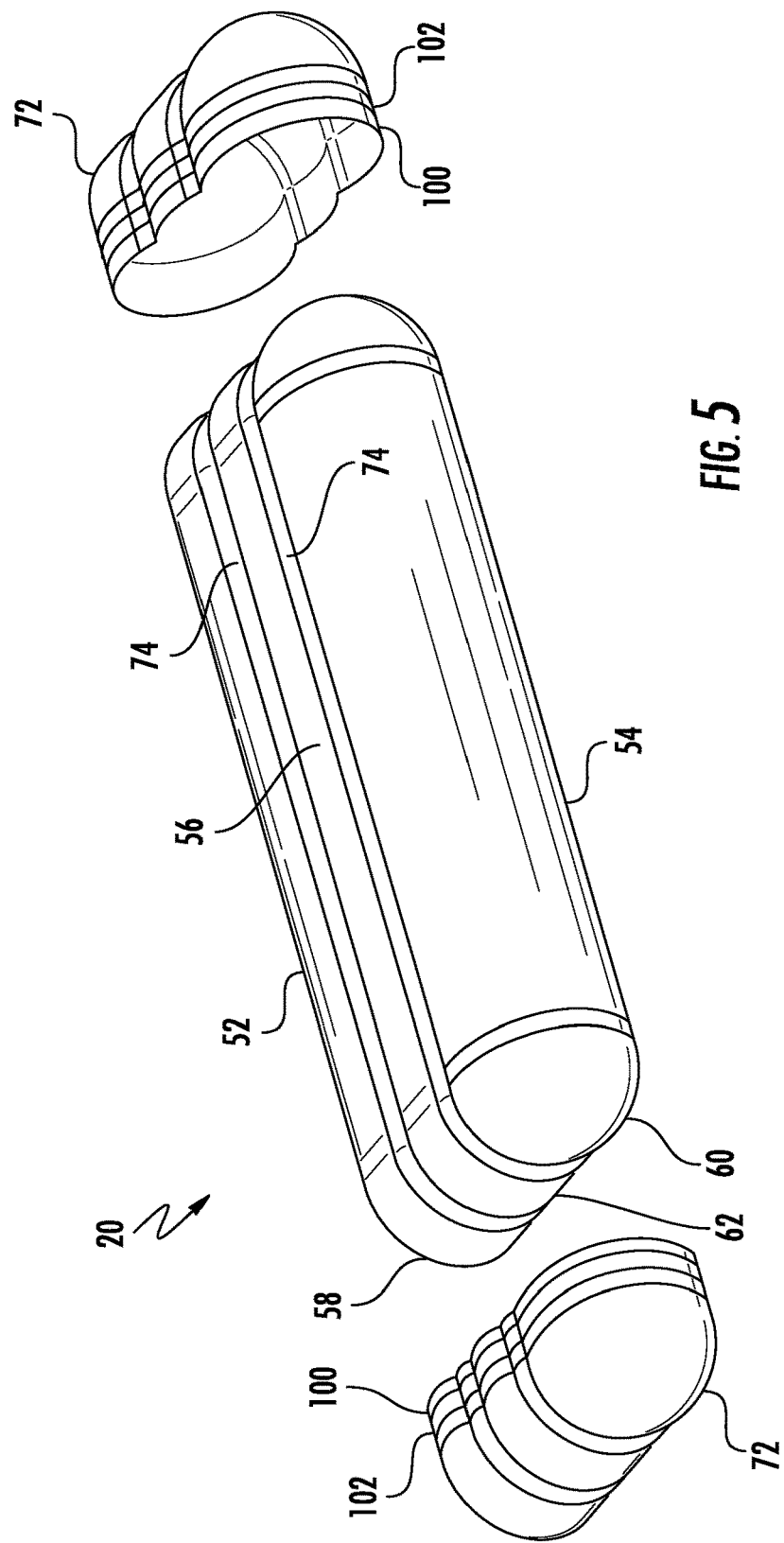
FIG. 5 is an exploded perspective view of the vessel assembly with the outer wall removed to show internal detail.

Referring to FIGS. 3, 4, and 5, The vessel assembly 20 may further include an outer wall 70, a pair of outer end caps 72, and at least one junction filler 74 (i.e., two illustrated) that may be a continuous junction band, which may be pre-molded. When the vessel assembly 20 is fully assembled, the outer wall 70 may substantially cover, and may wrap about the inner walls 52, 54, 56, and the outer end caps 72 may cover the inner end caps 58, 60, 62. More specifically, a single outer end cap 72 may cover three inner end caps 52, 54, 56. The outer wall 70 may extend axially between, and is engaged to, the outer end caps 72 forming respective multi-stepped, outer, seams 76 (see FIG. 1).

When the vessel assembly 20 is assembled, the junction band 74 may be located at Y-shaped seams. One such Y-shaped seam is established where the outer wall 70 and the inner walls 52, 56 generally meet and are adhered to one-another. Another Y-shaped seam is established where the outer wall 70 and the inner walls 54, 56 generally meet one-another. Each junction band 74 may be generally triangular in cross section to fill the void at the center of the Y-shaped seams. When the vessels 22, 24, 26 are under internal pressure, areas proximate to and/or at the junction bands 74 are designed to withstand significant through-thickness tensile stress that would otherwise challenge layered composite structures. The junction band 74 may be made of a bulk molding compound (BMC), and/or of the same material as the inner walls 52, 54, 56, or the outer wall 70, or fabric or prepreg with continuous fibers.

Figure 6:
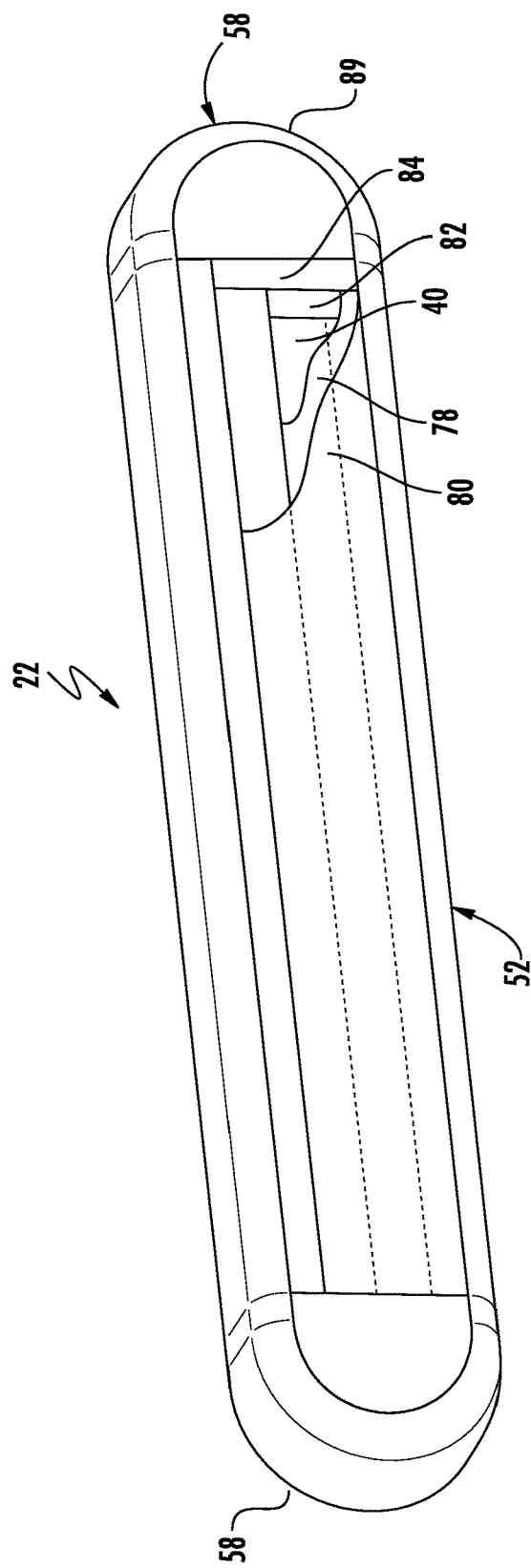
FIG. 6 is a perspective view of a vessel of the vessel assembly with portions removed to show internal detail.
Figure 7:
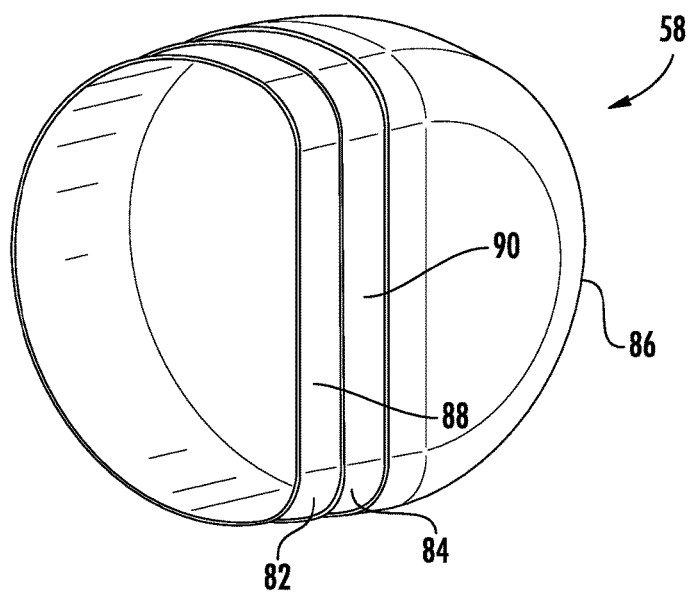
FIG. 7 is a perspective view of an end cap of the vessel.
Figure 8:
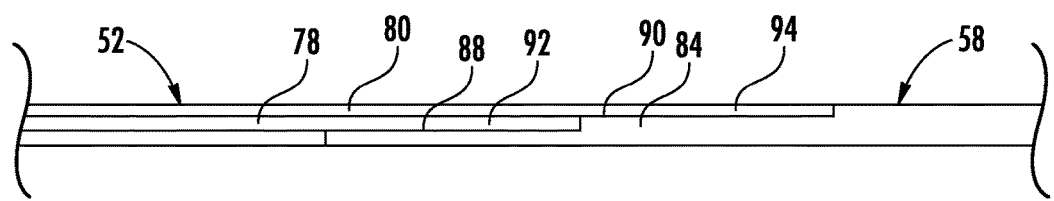
FIG. 8 is a partial cross section of the vessel.

Referring to FIGS. 6, 7, 8, the vessel 22 of the vessel assembly 20 and associated components are illustrated for simplicity of explanation. However, it is understood that the other vessels 24, 26 and/or other components may be similar in construction. For example, the outer wall 70 may be similar in construction to the inner walls 52, 54, 56, and the outer end caps 72 may be similar to the inner end caps 58, 60, 62 in some aspects. The inner wall 52 may include a plurality of layers (i.e., two illustrated as 78, 80). Any one or more of the layers 78, 80 may be made of a sheet molding compound (SMC). The layers 78, 80 may be a composite, and may be a continuous fiber wrapping or prepregs (i.e., fiber with resin) wrapped about liners for structural strength and for distributing internal stress. Alternatively, the layers 78, 80 may include a braiding. The primary reinforcement (i.e., the fibers or braiding), may be made of a carbon fiber, a glass fiber or an aramid fiber. A matrix material or resin for binding the continuous fibers may include epoxy, vinyl ester, urethane, and other resin polymers that may be nano-enhanced. It is further contemplated and understood that the layers 78, 80 may comprise other materials and/or processes including automated fiber placement, winded filaments, and/or a mixture of continuous and non-continuous fiber.

The inner end caps 58 may be stepped end caps. That is, the end cap 58 may include a plurality of steps (i.e. two illustrated as 82, 84) and a dome segment 86. Each step 82, 84 may generally be a band that extends circumferentially about the associated centerline C, and projects axially from the dome segment 86 and toward the inner wall 52. Steps 82, 84 may include respective surfaces 88, 90 that face radially outward and span both circumferentially and axially. In one embodiment, surface 88 may be disposed radially inward from surface 90.

When the vessel 22 is assembled, the inner end caps 58 cover, are in close proximity to, and may be adhered to, the end portions 46 of the liner 28. The layer 78 may be wrapped about, and may be adhered to, the mid-portion 40 of the liner 28. Axially opposite end portions 92 of the layer 78 may be located radially outward from, and may be adhered to, the surface 88 of the step 82. In one embodiment, the layer 78 may be substantially flush with the axially adjacent step 84.

The layer 80 of the inner wall 52 may be wrapped about, and may be adhered to, the layer 78. The layer 80 may include opposite end portions 94 that project outward in axially opposite directions. When assembled the end portions 94 project axially outward further than the end portion 92 of the layer 78. The end portions 94 may be located radially outward from, and may be adhered to, the surface 90 of the step 84. In one embodiment, the layer 80 may be substantially flush with the dome segment 86 of the end cap 58.

The multi-stepped seam 64 may generally be a plurality of staggered seams, which may be staggered in both axial and radial directions. More specifically, a first seam of the multi-stepped seam 64 may be represented by the adherence of the surface 88 of the step 82 to the end portion 92 of the layer 78. The second seam, which is displaced axially and radially from the first seam, may be represented by the adherence of the surface 90 of the second step 84 to the end portion 94 of the layer 80.

Referring to FIGS. 3 and 4, the outer wall 70 of the vessel assembly 20 may include a plurality of layers (i.e., two illustrated as 96, 98), and the outer cap 72 (see FIG. 5) may include a plurality of steps (i.e., two illustrated as 100, 102). During assembly, and after the vessels 22, 24, 26 are assembled, the junction bands 74 may be generally placed between the associated vessels. With the vessels 22, 24, 26 and junction bands 74 properly orientated, the outer end caps 72 may be placed over the associated end caps 58, 60, 62 of the respective vessels 22, 24, 26. In one embodiment, the outer end cap 72 may be adhered to portions of the inner end caps 58, 60, 62 and portions of the junction bands 74.

After placement of the outer caps 72, the first layer 96 of the outer wall 70 may be wrapped about the vessels 22, 24, 26 adhering to portions of the outer layers 80 of the inner walls 52, 54, 56 and portions of the junction bands 74. Although not specifically illustrated, and similar to the staggered seam 64 of the vessel 22 previously described, an end portion of the layer 96 may adhere to the step 100 of the outer cap 72, and an end portion of the layer 98 may adhere to the step 102.

Figure 9:
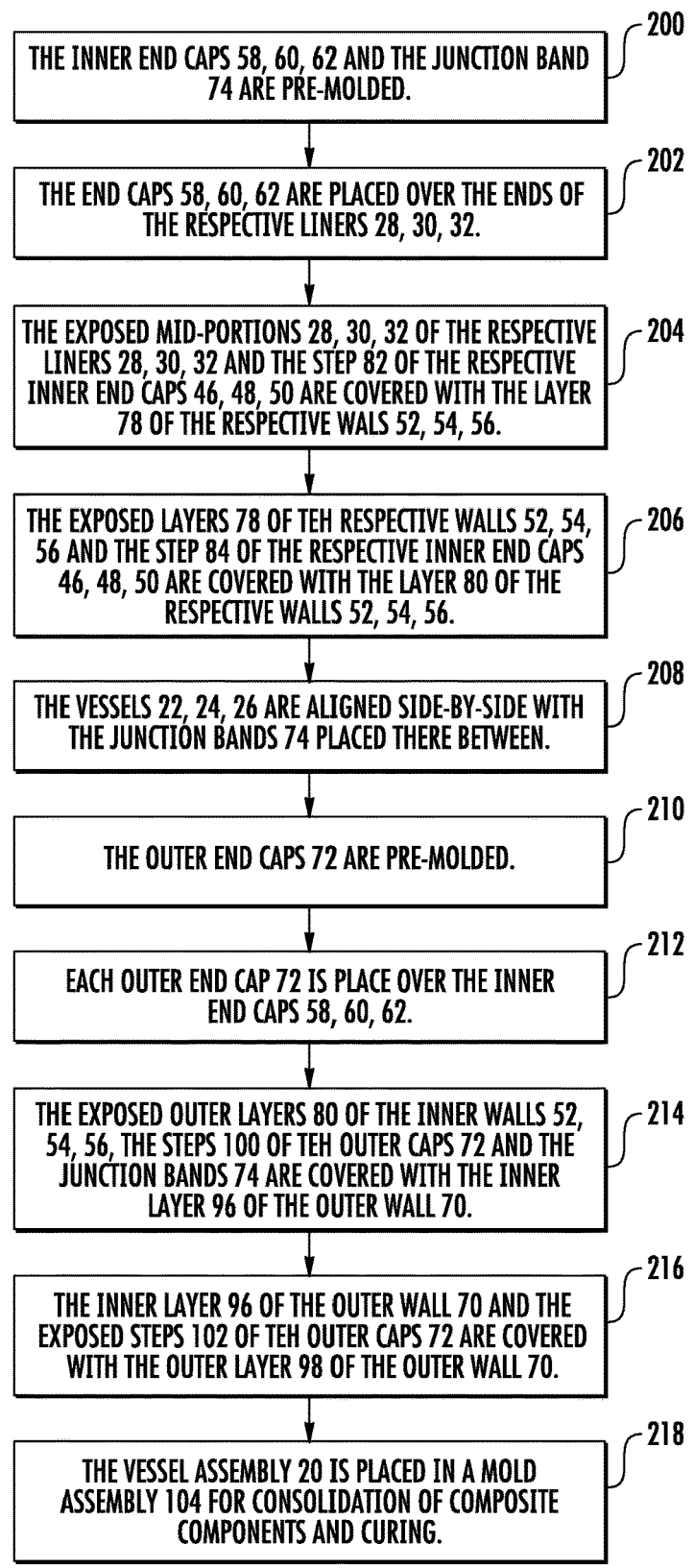
FIG. 9 is a flow chart of a method of manufacturing the vessel assembly.

Referring to FIG. 9, a method of manufacturing the vessel assembly 20 is illustrated. At block 200, the inner end caps 58, 60, 62 and the junction bands 74 may be molded, and may be partially cured for handling. At block 202, the end caps 58, 60, 62 are placed over, and may be adhered to the ends of the respective liners 28, 30, 32. At block 204, the exposed mid-portions 40, 42, 44 of the respective liners 28, 30, 32 and the step 82 of the respective inner end caps 46, 48, 50 may be covered and/or wrapped, with the layer 78 of the respective walls 52, 54, 56. The layer 78 may thus be adhered to the step 82 and the mid-portions 40, 42, 44. At block 206, the exposed layers 78 of the respective walls 52, 54, 56 and the step 84 of the respective inner end caps 46, 48, 50 may be covered and/or wrapped, with the layer 80 of the respective walls 52, 54, 56. The layer 80 may thus be adhered to the step 84 and the inner layer 78.

With the individual vessels 22, 24, 26 generally assembled and at block 208, the vessels may be aligned side-by-side with the junction bands 74 place there between. In one embodiment, the various components may be only partially cured thus aiding in the adherence of the various components to the adjacent component. For example, a side portion of the outer layer 80 of wall 52 may be in contact with and adhered to a side portion of the outer layer 80 of the wall 56.

At block 210, the outer end caps 72 may be molded. In one embodiment, the end caps 72 may be only partially cured during assembling of the vessel assembly 20 to aid in adherence to adjacent components. At block 212, each outer end cap 72 is placed over, may cover, and may be adhered to, the inner end caps 58, 60, 62. At block 214, the exposed outer layers 80 of the inner walls 52, 54, 56, the steps 100 of the outer caps 72 (see FIG. 5), and the junction bands 74 may be covered, and/or wrapped, with the inner layer 96 (see FIG. 3) of the outer wall 70. The layer 96 may thus be adhered to the exposed portions of the outer layer 80, the steps 100, and the exposed portions of the junction bands 74. At block 216, the inner layer 96 of the outer wall 70 and the exposed steps 102 of the outer caps 72 may be covered and/or wrapped, with the outer layer 98 of the outer wall 70. The outer layer 98 may thus be adhered to the step 102 and the inner layer 96.

Figure 10:
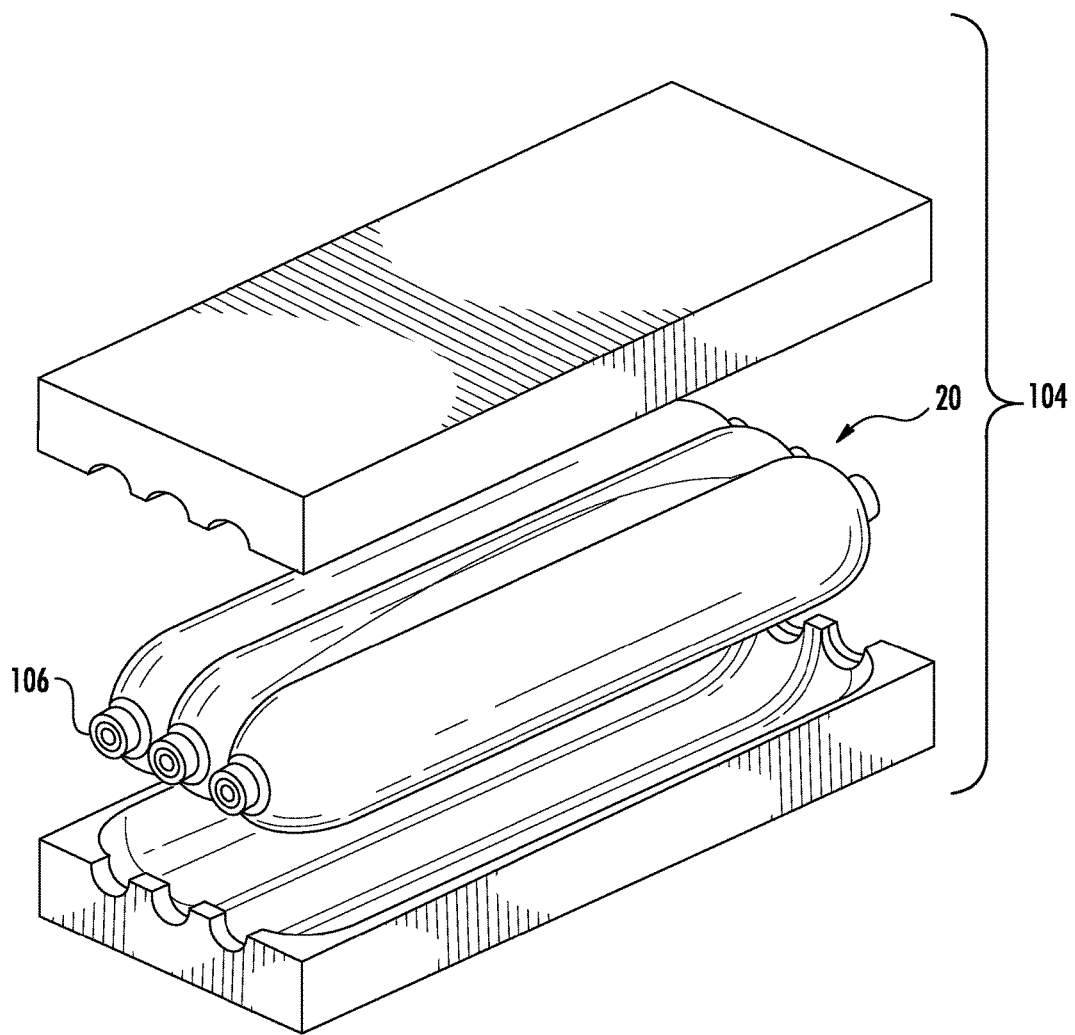
FIG. 10 is a perspective view of a mold assembly use to manufacture the vessel assembly.

At block 218, the entire vessel assembly 20 may not yet be fully cured and may be placed in a mold assembly 104 (see FIG. 10). The mold assembly 104 may facilitate pressing of the vessel assembly 20 to consolidate the various composite components until fully cured. In one embodiment, the chambers 34, 36, 38 of the respective vessels 22, 24, 26 may be filled with a gas-absorbent material that serves as a mandrel and also provides support when the mold assembly pressure is applied. Alternatively, internal pressure facilitated by a compressed gas can be applied inside of the liners 28, 30, 32. The various composite-based components may be fully cured by applying heat during the compression molding process. Alternatively, the mold assembly 104 may be placed within a heated oven for composite curing.

It is contemplated and understood that the vessel assembly 20 may include only one vessel and may not require the outer wall 70 and the outer end caps 72. In another embodiment, the vessel assembly 20 may not include outer end caps 72, and instead, the entire assembly may be wrapped with the outer wall 70 (i.e., including any end portions). In another embodiment, any one or more of the various, molded, end caps 58, 60, 62, 72 may include a nozzle 106 (see FIG. 10).

Advantages and benefits of the present disclosure include a lightweight storage tank with a high energy storage density. The method(s) may significantly reduce the composite manufacturing tooling otherwise needed. Moreover, the material sections may tailor manufacturing feasibility and material mechanical properties for the vessel assembly. That is, based on analysis of an internal pressurized vessel, the stresses produced at the domed ends may generally be lower than the hoop stresses around the main tube or cylindrical portions. The mechanical performance of BMC is generally lower than that of SMC which makes them a unique and novel combination for a pressure vessel. The manufacturing approach may produce a net-shaped tank assembly requiring no, or minimal, surface finishing.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A composite vessel assembly comprising:
   a circumferentially continuous first wall including a plurality of layers;
   a first end cap including a plurality of steps, wherein each step of the plurality of steps is engaged to a respective layer of the plurality of layers;
   a plurality of inner walls extending circumferentially about respective centerlines aligned side-by-side, wherein the first wall is one of the plurality of inner walls; and
   a plurality of inner end caps each associated with a respective one of the plurality of inner walls, wherein the first end cap is one of the plurality of inner end caps;
   an outer wall extending about the plurality of inner walls, the outer wall including a plurality of layers;
   an outer end cap disposed over the plurality of inner end caps, wherein the outer end cap includes a plurality of steps and each one of the plurality of layers of the outer wall is engaged to a respective step of the plurality of steps; and
   at least one junction band disposed between the adjacent inner walls and the outer wall.

2. The composite vessel assembly set forth in claim 1, wherein the at least one junction band is pre-molded.

* * * * *